United States Patent Office

2,948,590
PROCESS FOR THE MANUFACTURE OF DICALCIUM PHOSPHATE

Donald J. Smalter and Raymond E. Tuttle, Lakeland, Fla., assignors to International Minerals & Chemical Corporation, a corporation of New York No Drawing. Filed Jan. 28, 1957, Ser. No. 636,468

4 Claims. (Cl. 23—109)

This invention relates to the manufacture of phosphatic animal feeds. More particularly, it relates to the manufacture of dicalcium phosphate.

Dicalcium phosphate of feed grade quality has been manufactured by precipitation from defluorinated solutions produced by the reaction of phosphate rock and mineral acids such as sulfuric acid. The reaction of "wet process" phosphate solutions of 10 to 20% $P_2O_5$ content with lime or limestone usually produce small particle size precipitates which present filtering problems.

Feed grade dicalcium phosphate has also been prepared by the reaction of phosphoric acid prepared by the electric furnace method with calcium carbonate. MacIntire, No. 2,108,940, points out that when phosphoric acid of 60 to 70% $H_3PO_4$ is reacted with limestone under conditions to form directly a dry product, unreacted water soluble phosphate remains and the reaction fails to go to completion leaving unreacted calcium carbonate. If more water is added, MacIntire points out that the excess water creates handling problems and must be dispelled either by prolonged curing or heat drying of the final product.

Curtis, No. 2,043,238, shows the preparation of dicalcium phosphate from phosphoric acid produced by the furnace method by reacting the acid with calcium carbonate in 2 stages. Curtis reacts calcium carbonate with phosphoric acid first in proportions to produce monocalcium phosphate and reacts the monocalcium phosphate with a slurry of calcium carbonate of approximately 30% by weight of water. This process, while it does drive the phosphate calcium carbonate reaction to completion, is relatively expensive because of the added expense of processing.

It is a primary object of this invention to overcome the shortcomings and disadvantages of processes heretofore in use.

It is another object of this invention to provide a one step process for conversion of "wet process" phosphoric acid to animal feed grade dicalcium phosphate.

It is another object of this invention to provide a method wherein the reaction of wet process acid and calcium carbonate is completed in one reaction stage to the point of eliminating substantially all free acid. The advantage of this, in eliminating product stickiness and corrosiveness toward shipping bags, will be apparent to those skilled in the art.

It is another object of this invention to provide a process wherein the product issuing from the contacting equipment is in such a stage of reaction and physical condition that the product can be sent directly to a finishing drying operation without damage of sticking and fouling equipment. These and other objects of the invention will be apparent to those skilled in the art.

So-called "wet process" phosphoric acid is produced by the reaction of materials such as Florida phosphate rock and sulfuric acid. The phosphoric acid produced is high in aluminum, iron, and fluorine contaminants. Removal of aluminum and iron by any of the precipitation methods entails appreciable losses of $P_2O_5$ values. Removal of fluorine by addition of precipitants such as calcium carbonate simultaneously removes at least part of the iron and aluminum together with $P_2O_5$ values. If the primary consideration is fluorine contamination as when phosphoric acid is to be used to prepare animal feeds or animal feed supplements, the fluorine can be removed by passage of steam through a relatively concentrated phosphoric acid.

Steam defluorinated phosphoric acid is quite unlike furnace acid in that the product is extremely viscous and contains up to about 40% by volume of suspended solids in an acid of 52% or higher $P_2O_5$ content. In order to maintain a flowable or pumpable wet process phosphoric acid of higher than 50% $P_2O_5$ content, the concentrated, steam defluorinated phosphoric acid must be maintained at a temperature higher than about 150° F.

Now it has been discovered that steam defluorinated "wet process" phosphoric acid can be used for the manufacture of dicalcium phosphate if the acid is heated to above 180° F. and the calcium carbonate is slurried with the proper amount of water before reaction with the acid.

It has been discovered further that wetting agents suitable under strongly acid conditions make it possible to obtain faster, more complete reaction between acid and limestone.

Briefly, the present invention comprises slurrying calcium carbonate with aqueous medium, the relative amount of water by weight being between 45 and 75% of the limestone depending upon the acid concentration, and admixing, under strong agitation conditions, said slurry with hot phosphoric acid of a concentration of at least 52% $P_2O_5$ and at a temperature higher than about 180° F. whereby a granular product is obtained which merely requires surface drying for storage or sale.

In a preferred form of the invention, the aqueous medium utilized for slurrying the calcium carbonate contains between about 0.05% and about 0.5% by weight of wetting agent. When adding the above amounts of wetting agents, the amount of water required may be reduced without slowing reaction rates or completeness of reaction.

More in detail, limestone is comminuted to a particle size such that at least 80% passes through a 200 mesh standard screen. The comminuted limestone is slurried with water in quantities to produce a slurry of solids content between about 50% and about 70% by weight. Quantities of water less than 30% by weight of the slurry fail to provide sufficient medium for complete reaction. Quantities of water greater than 50% produce a wet, sticky product which creates handling problems and which must be cured and set to a surface dry solid before it is capable of being handled in a dryer to remove excess water.

Quantities of water may be reduced by 25 to 40% if a non-toxic wetting agent is added to the calcium carbonate slurry such as aliphatic polyoxyethylene ethers, alkyl aryl sulfonates and the like. The most effective members of the ether group are those produced by the reaction of an aliphatic alcohol containing 9 to 15 carbon atoms with between about 8 and 12 moles of ethylene oxide. Slightly less effective than the ether group are the sulfonates such as sodium alkyl naphthalene sulfonate, and the like. Wetting agents are added generally in quantities in the range between 0.05% and about 0.5% by weight of the product or in quantities constituting between 0.1% and 1.0% by weight of the limestone. Water in an amount as small as 35% of the weight of limestone and preferably between 35 and 75%, may be used to prepare the slurry when a non-toxic wetting agent is also used to prepare the slurry.

From the foregoing, it will be apparent that the solids content of the slurry may be increased to about 74% by weight when a non-toxic wetting agent is present.

Limestone slurry, with or without a wetting agent, is mixed with defluorinated "wet process" phosphoric acid. Concentrated acid of this type is not free of contaminants other than fluorine and contains 3 to 8% iron phosphates and 2 to 6% aluminum phosphate as a major contaminant. The "wet process" acid, as produced, generally runs between about 26 and 30% $P_2O_5$. Such dilute acid reacts poorly with limestone, and fails to give completeness of reaction such as to produce a product having substantially zero free acid in the dicalcium phosphate product. The "wet process" acid to be useful in the present process, is concentrated by suitable means and defluorinated as by the use of steam. Effective concentration of phosphoric acid, for use in this process, is between about 52 and about 56% $P_2O_5$. At this concentration, the viscous phosphoric acid solution, as stated above, must be maintained hot, i.e., at a temperature between about 150° F. and the boiling point of the phosphoric acid (270° F. to about 305° F., depending upon the acid concentration) to be in condition for distribution and mixing with the slurry of calcium carbonate.

Thorough mixing of the acid and limestone slurry is a necessity for reaction and must be of a nature to bring the ingredients and the heavy slurry mixtures into intimate contact with one another. Suitable equipment for such mixing operations are pug mills and the like. The mixture of acid and limestone being contacted may be handled in one of two ways, depending upon the holding time in the mixer. If the holding time is short, although intimate contacting has been thorough due to high speed agitation, the mixture may be discharged upon a suitable conveyor adapted to keep the solid material in agitating movement as in a ribbon conveyor, where the reaction will go to completion and the foaming end in a period of from about 1 to 5 minutes, at the end of which time the granular material may be discharged to a drying stage where the excess surface moisture is driven off. Preferably, the acid and limestone are given a holding time in the mixer such that the foaming reaction is substantially complete when the mixture discharges and this material can be sent directly to the drying operation. The material going to the drying operation, after tumbling in the dryer, produces a product which is substantially all —8 mesh standard size and 50% of which is generally of a particle size in the range of —20 +100 mesh.

Larger particle size product is ground to produce suitable size material and fines which are separated out by a screening operation. These fines can be recycled for agglomeration, and if the material discharging from the mixture is still a foam mixture, the fines are delivered to a point where granular product first appears in order not to interfere with reacting limestone-phosphoric acid mix.

Limestone and phosphoric acid are mixed in substantially stoichiometric equivalent amounts necessary for formation of dicalcium phosphate. Generally, an excess of limestone less than 5% over that required for reaction is maintained.

The invention will be more fully understood from a study of the following examples which are given for purposes of illustration without any intention that the invention be limited strictly thereto.

*Example I*

Limestone was comminuted to a particle size such that 80% passed through a 200 mesh standard screen. This comminuted limestone was divided into 5 portions, A, B, C, D, and E.

150 parts by weight of dry calcium carbonate of portion A were mixed in a pug mill mixer with 170 parts by weight of phosphoric acid of 80% $H_3PO_4$ at ambient temperature (viscosity of 30 cp.), prepared by the conventional electric furnace method. The reaction mixture, after about 3 minutes mixing time in a Patterson pug mill, was discharged from the mixer as foaming solids onto a 6′ long vibrating conveyor belt. The solids discharged from the belt were passed through a rotary kiln dryer where the temperature was maintained at approximately 130° F. and discharged to storage. Product analysis is as follows:

| Composition: | Percent by weight |
|---|---|
| $P_2O_5$ | 43.1. |
| Water soluble $P_2O_5$ | 27.3. |
| Percent free acid | 0.08. |
| CaO | 34.8. |
| $Al_2O_3$ | Negligible. |
| $Fe_2O_3$ | Negligible. |

*Example II*

Florida phosphate rock was ground to a particle size approximately 80% of which passed through a 200 mesh standard screen. This rock analyzed about 68% bone phosphate of lime. To each 100 parts by weight of comminuted rock was added approximately 80 parts by weight (100% sulfuric acid basis) of approximately 92% aqueous sulfuric acid solution. The slurry mixture was treated in accordance with conventional phosphoric acid manufacturing procedures to remove solids and to recover the solution of approximately 26% $P_2O_5$ content and approximately 1.8% fluorine. This dilute phosphoric acid solution was heated to approximately 270° F. in concentration apparatus and a concentrated solution obtained of approximately 77% phosphoric acid (approximately 55° Bé.). This acid contained 4.5% iron phosphate, 5.0 aluminum phosphate, 56% total $P_2O_5$, 3½% free sulfuric acid, and 1.4% fluorine.

Steam, at a temperature of approximately 500° F., was passed through the concentrated acid which was maintained at a temperature of about 310° F. until the fluorine content was reduced to approximately 0.1%. The defluorinated acid was stored at a temperature of approximately 180° F. to keep the material fluid pending use. This stored material has a viscosity of approximately 60 centipoises at 200° F. Hot defluorinated acid was fed to the same pug mill mixer and dryer system as was used in Example I. To each 290 parts by weight of the hot acid was added 150 parts by weight of dry calcium carbonate, portion B. Mixing time as in Example I was approximately 3 minutes. Product being delivered to storage analyzed as follows:

| Composition: | Percent by weight |
|---|---|
| $P_2O_5$ | 47.6 |
| Water soluble $P_2O_5$ | 5.7 |
| Percent free acid | 4.5 |
| $Fe_2O_3$ | 2.0 |
| $Al_2O_3$ | 2.0 |
| CaO | 25.0 |

*Example III*

Hot concentrated acid, of a composition shown in Example II, was diluted to 53% $H_3PO_4$. This diluted acid was fed to the same pug mill and dryer system as was used in Example I. 415 parts by weight of this 53% phosphoric acid was mixed with 150 parts by weight of dry calcium carbonate, portion C. Mixing time, as in Example I, was approximately 3 minutes. Product being delivered to storage analyzed as follows:

| Composition: | Percent by weight |
|---|---|
| $P_2O_5$ | 45.8 |
| Water soluble $P_2O_5$ | 1.93 |
| Percent free acid | 0.96 |
| $Fe_2O_3$ | 2.0 |
| $Al_2O_3$ | 2.0 |
| CaO | 24.5 |

Example IV

Calcium carbonate of portion D was mixed with water in the proportion 125 parts water to 150 parts limestone, and the slurry agitated to maintain uniformity. This slurry was fed to the same plug mill and dryer system as used in Example I. To each 275 parts by weight of calcium carbonate slurry was added 290 parts by weight of 77% phosphoric acid. Mixing time, as in Example I, was approximately 3 minutes. Product being delivered to storage analyzed as follows:

Composition: Percent by weight
$P_2O_5$ _____ 47.1
Water soluble $P_2O_5$ _____ 1.2
Percent free acid _____ 0.19
$Fe_2O_3$ _____ 2.0
$Al_2O_3$ _____ 2.0
CaO _____ 24.5

Example V

Calcium carbonate, portion E, was divided into 4 segments; E-1, E-2, E-3, and E-4. Material E-1 was slurried with 50% by weight of water, i.e., 100 parts calcium carbonate to 50 parts by weight of water. Segments E-2, E-3, and E-4 were slurried with 75, 50, and 75 parts by weight of water respectively. To slurried samples E-1 and E-2 were added 0.3 part by weight per each 200 parts by weight of product of sodium alkyl aryl sulfonate (trade name—Santomerse #1). To slurried samples E-3 and E-4 were added 0.3 part by weight per 200 parts by weight of product of aliphatic polyoxyethylene ether (Sterox AJ). Mixing time was the same as in Example I, approximately 3 minutes. Each of the products delivered to storage analyzed as follows:

|      | Water, percent | Total $P_2O_5$ | Water Soluble $P_2O_5$ | Percent Free Acid |
|------|----------------|----------------|------------------------|-------------------|
| E-1  | 50             | 42.8           | 8.0                    | 0.2               |
| E-2  | 75             | 44.2           | 6.8                    | 0.0               |
| E-3  | 50             | 41.6           | 5.8                    | 0.0               |
| E-4  | 75             | 41.0           | 6.4                    | 0.0               |

These samples show essentially complete elimination of free acid in the product using less water than in Example IV. The advantages of the addition agent in reducing water and eliminating free acid will be apparent to experienced people in reduced drying loads and less stickiness of product.

Having thus described our invention, what we claim is:

1. The process for the production of a granular, animal feed grade, dicalcium phosphate product which comprises forming a slurry having a solids content between about 50% and about 70% by weight of comminuted calcium carbonate and an aqueous medium, thoroughly mixing and reacting said slurry with defluorinated wet-process phosphoric acid preheated to a temperature of at least about 150° F. and having a concentration of between about 52% and 56% $P_2O_5$, and agitating the reaction mixture so formed until the reaction between said calcium carbonate and said phosphoric acid is substantially complete, said slurry and said acid being reacted in at least about the stoichiometric amount necessary for the formation of dicalcium phosphate to produce a substantially phosphoric acid and water-soluble calcium phosphate-free granular dicalcium phosphate product, the particle size of said product being substantially entirely minus eight mesh, at least about 50% of said product having a particle size in the range of minus twenty to plus one hundred mesh.

2. The process of claim 1 wherein said phosphoric acid is preheated to a temperature between about 150° F. and the boiling point of said acid.

3. The process of claim 1 wherein the said slurry is utilized in about 105 percent of the stoichiometric equivalent amount necessary for the formation of dicalcium phosphate.

4. The process for the production of a granular, animal feed grade, dicalcium phosphate product which comprises forming a slurry having a solids content between about 50% and about 74% by weight of comminuted calcium carbonate and an aqueous medium, there being present in said slurry a non-toxic wetting agent selected from the group consisting of the aliphatic polyoxethylene ethers and the alkyl aryl sulfonates, said wetting agent being present in an amount between about 0.1% and about 1.0% by weight of said calcium carbonate, thoroughly mixing and reacting said slurry with defluorinated wet-process phosphoric acid preheated to a temperature of at least about 150° F. and having a concentration of between about 52% and 56% $P_2O_5$, and agitating the reaction mixture so formed until the reaction between said calcium carbonate and said phosphoric acid is substantially complete, said slurry and said acid being reacted in at least about the stoichiometric amount necessary for the formation of dicalcium phosphate, to produce a substantially phosphoric acid and water-soluble calcium phosphate-free, granular, dicalcium phosphate product, the particle size of said product being substantially entirely minus eight mesh, at least about 50% of said product having a particle size in the range of minus twenty to plus one hundred mesh.

References Cited in the file of this patent

UNITED STATES PATENTS

| | | |
|---|---|---|
| 2,067,538 | MacIntire | Jan. 12, 1937 |
| 2,108,940 | MacIntire | Feb. 22, 1938 |
| 2,287,699 | Moss et al. | June 23, 1942 |